(12) United States Patent
Medeiros et al.

(10) Patent No.: US 12,049,337 B2
(45) Date of Patent: *Jul. 30, 2024

(54) AUTOMATIC CASE PACKING EQUIPMENT FOR STAND-UP POUCHES

(71) Applicant: SYSTEMEX AUTOMATION INC., Laval (CA)

(72) Inventors: Kelsey Medeiros, St-Constant (CA); Robert Battaglia, Terrebonne (CA)

(73) Assignee: SYSTEMEX AUTOMATION INC., Laval (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,780

(22) Filed: Jan. 13, 2023

(65) Prior Publication Data

US 2023/0150702 A1    May 18, 2023

Related U.S. Application Data

(63) Continuation of application No. 17/209,629, filed on Mar. 23, 2021, now Pat. No. 11,577,862.

(51) Int. Cl.
| | |
|---|---|
| *B65B 5/06* | (2006.01) |
| *B65B 35/36* | (2006.01) |
| *B65G 17/32* | (2006.01) |
| *B65G 47/08* | (2006.01) |

(52) U.S. Cl.
CPC .............. *B65B 5/061* (2013.01); *B65B 35/36* (2013.01); *B65G 17/323* (2013.01); *B65G 47/08* (2013.01)

(58) Field of Classification Search
None
See application file for complete search history.

(56) References Cited

U.S. PATENT DOCUMENTS

| | | | |
|---|---|---|---|
| 4,611,458 A * | 9/1986 | Prakken | B65B 35/38 53/247 |
| 6,540,063 B1 | 4/2003 | Fallas et al. | |
| 7,644,558 B1 | 1/2010 | Fallas | |
| 8,997,438 B1 | 4/2015 | Fallas | |
| 11,279,504 B2 | 3/2022 | Kimura | |
| 11,577,862 B2 * | 2/2023 | Battaglia | B65B 5/061 |
| 11,760,518 B2 * | 9/2023 | Potter | B65B 35/36 53/473 |
| 2020/0361650 A1 | 11/2020 | Nishitsuji et al. | |

FOREIGN PATENT DOCUMENTS

WO        2019206924 A1    10/2019

* cited by examiner

*Primary Examiner* — William R Harp

(57) ABSTRACT

A system for packing a case with articles, the system including a conveying device to convey articles to be packed, in a serial configuration and a support for a case to be packed with the articles in which the articles are configured to be placed in a plurality of rows, including a first row, a second row adjacent to the first row and a last row adjacent to a side wall of the case.

19 Claims, 8 Drawing Sheets

AUTOMATIC CASE PACKING EQUIPMENT FOR STAND-UP POUCHES

FIELD OF THE INVENTION

The invention relates to automated equipment and processes to place into a case, such as a cardboard box, stand-up pouches into the upright configuration. The invention can be used to provide retail-ready packaging where the case can be opened and placed on a shelf of a retail store and a consumer can directly pick up the pouch from the case.

BACKGROUND

For many years, attempts have been made to develop improved systems for picking up individual articles from a conveyor system and depositing those articles within a container, such as a corrugated cardboard box. The desire is to accomplish this task with speed and accuracy. To meet the demand for speed, past solutions have used multiple robots along the conveyor, such as described in U.S. Pat. No. 6,540,063. Often, if four such robot heads are used, each head picks up every fourth article on the conveyor system in a staggered manner so that the four robot heads effectively remove four consecutive articles during each cycle. While this multiplicity of heads increases the packing speed, the means for moving the robot heads from the conveyor system to the container may be awkward or cumbersome to implement.

To provide greater flexibility, multi-axis robots have been developed for picking an article off of a common conveyor. Many such multi-axis robots, however, have proven to be fairly slow and heavy. Hence, while such robots may provide greater flexibility in motion, they have also provided a need for an even greater number of robots to meet the speed requirements in the marketplace today. Additionally, it has been found that with some three-axis robots, the range of movement may be limited in certain directions. For example, certain three-axis robots are very limited in their vertical component, which can make movement of an article from a conveyor into a deep container difficult to perform.

To provide even greater flexibility, multi-axis robots as disclosed in U.S. Pat. Nos. 7,644,558 and 8,997,438, can be used for picking an article off of a common conveyor and placing the article in a container. The multi-axis robot can provide the desired speed of operation with the desired range of movement and can accurately pick articles from the conveying system and place them into containers.

Even with the improvements made so far in case packing, operators are continually striving for faster and more efficient systems for packing articles from a conveyor into containers. Operators are also striving to implement these systems in a manner that meets "shelf-ready packaging" (SRP) or "retail-ready packaging" (RRP) requirements. SRP and RRP generally refer to the preparation of a product that is delivered to a retailer in a ready-to-self merchandised unit.

For example, SRP and RRP products can be easily placed on a shelf without the need for unpacking or repacking. In that regard, SRP and RRP products may be packaged in containers that allow the container to be shipped, stacked, and opened on a pallet in a manner that allows the product to be displayed in the opened container in an isle on the floor of a retail outlet. For example, SRP and RRP products may be packaged in a container in an upright or vertical position, aligned in one or more rows within the container, such that the product brand or name, and/or contents, can be seen while the product remains in the container.

SUMMARY OF THE INVENTION

A system for packing a case with articles, the system including a conveying device to convey articles to be packed, in a serial configuration and a support for a case to be packed with the articles in which the articles are configured to be placed in a plurality of rows, including a first row, optionally a second row adjacent to the first row and a last row adjacent to a side wall of the case. A robotic mechanism is provided configured to pick-up a batch of articles from the conveying device and to deposit the batch of articles into the case, the robotic mechanism including an article supporting device moveable between an extended position and a retracted position, the robotic mechanism being configured to execute a first and a second article loading cycle in the case, wherein the first article loading cycle is characterized by lowering a batch of articles in the case and retracting the article supporting device to allow the batch of articles to sit on a bottom of the case and the second article loading cycle is characterized by retracting the article supporting device while the batch of articles is at a distance from the bottom of the case and allowing the batch of articles to fall in the case while being guided by an adjacent row of articles already deposited in the case and the side wall of the case.

A method for packing a case with articles, the method comprising, conveying articles to be packed, in a serial configuration, supporting a case to be packed with the articles in which the articles are configured to be placed in a plurality of rows, including a first row and a last row adjacent to a side wall of the case, picking-up a batch of articles from the conveying device and depositing the batch of articles into the case with a robotic mechanism including an article supporting device moveable between an extended position and a retracted position, the robotic mechanism being configured to execute a first and a second article loading cycle in the case, wherein:
  i. the first article loading cycle being characterized by lowering a batch of articles in the case and retracting the article supporting device to allow the batch of articles to sit on a bottom of the case;
  ii. a second article loading cycle characterized by retracting the article supporting device while the batch of articles is at a distance from the bottom of the case and allowing the batch of articles to fall in the case while being guided by an adjacent row of articles already deposited in the case and the side wall of the case.

DESCRIPTION OF AN EXAMPLE OF IMPLEMENTATION OF THE INVENTION

Figure 1:
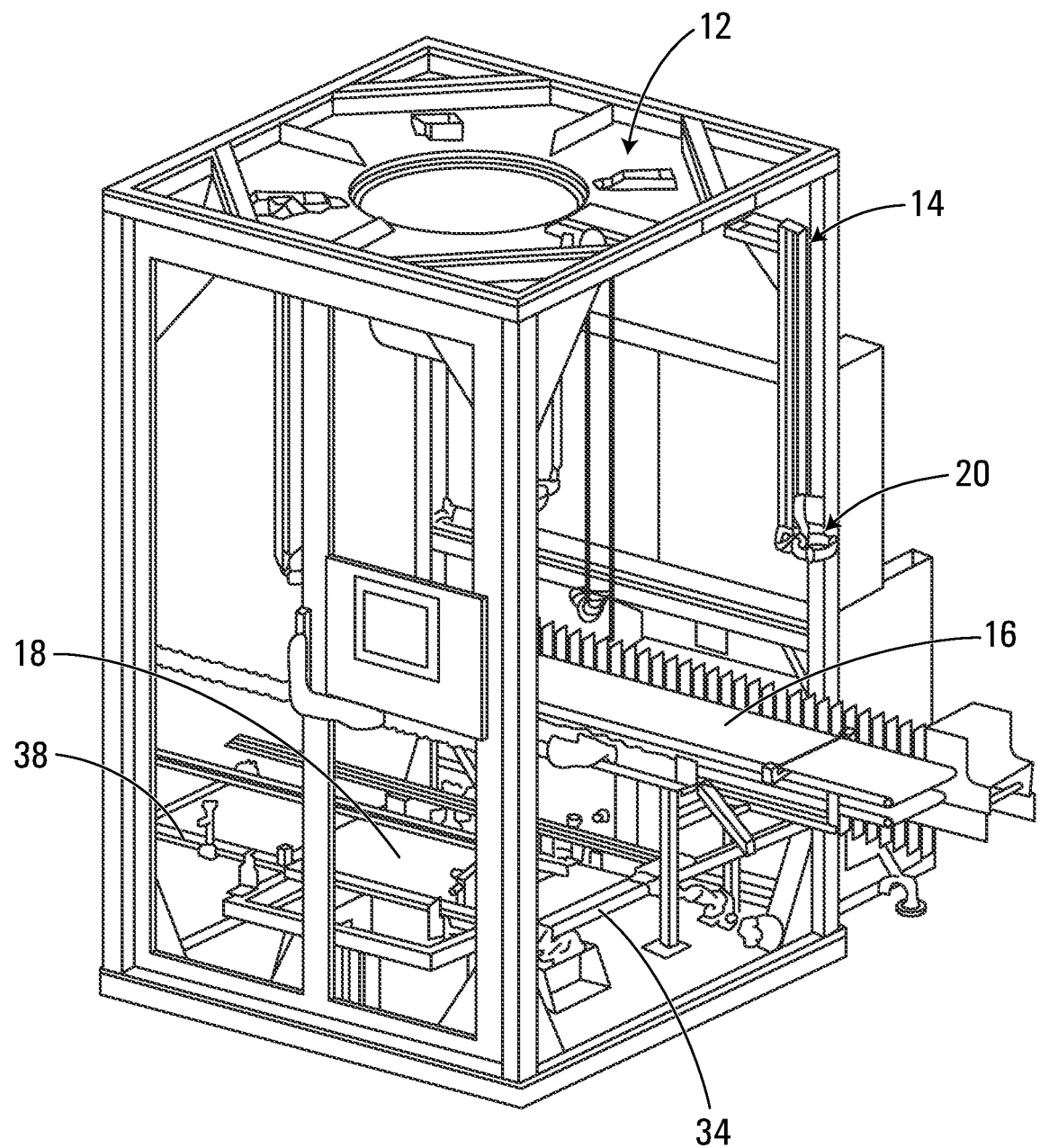
FIG. 1 is a perspective view of a robotic cell for packing pouches in a stand-up configuration in a case.

FIG. 1 is a perspective view of a robotic cell having an arrangement of components to automatically load a case, such as a cardboard box with stand-up pouches according to a predetermined arrangement.

Figure 2:
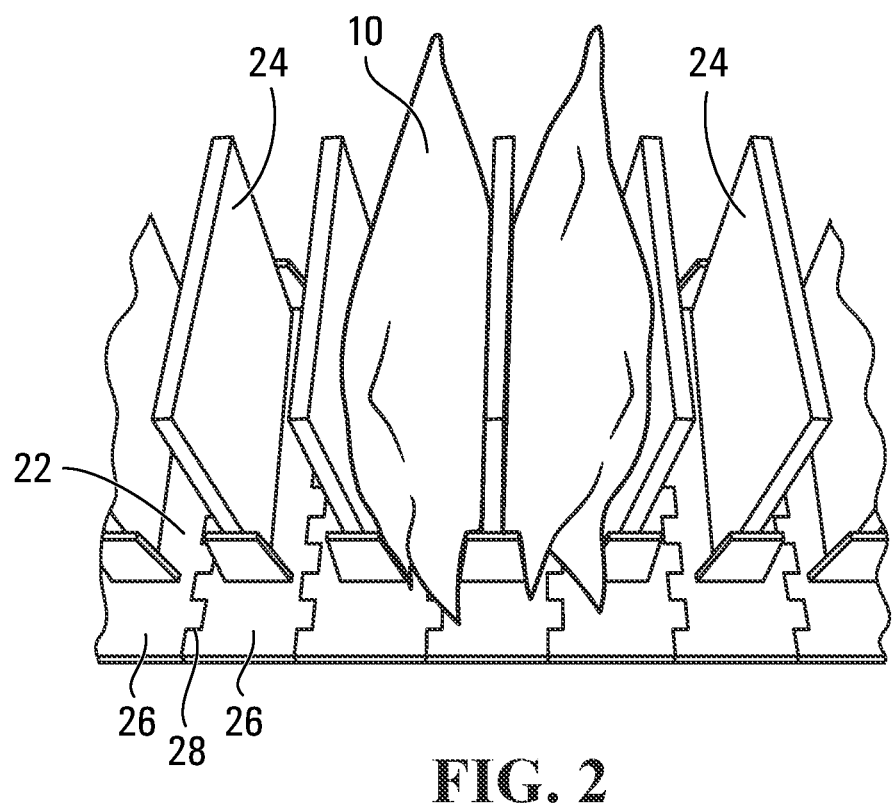
FIG. 2 is perspective view from above of a plurality of stand-up pouches between cleats of a cleats conveyor.

A stand-up pouch is shown at 10 FIG. 2. The stand-up pouch 10 has side walls joined at an upper edge and a bottom portion that is configured to form a base on which the pouch can stand in the upright position. Typically, the base would be wide enough to provide a stable platform such that the pouch can remain in the upright position. In contrast, the upper end of the pouch can be significantly narrower than the base and can be formed by crimping the side walls at their upped ends or securing them with a releasable fastening mechanism, such that the pouch can be opened to gain access to the contents and then re-closed. This arrangement is useful for food products, where re-closing the pouch allows to keep the product fresh longer.

Stand-up pouches are popular in the food retail industry to market granular or particulate products, such as rice, cheese bits and flour among many other products.

Referring back to FIG. 1, the robotic cell 12 has a frame 14 which forms a module allowing to integrate the various component of the apparatus into a single unit that can be placed at the desired location in a packaging plant and moved around if necessary, such as to service a number of packaging lines.

The robotic cell 12 has three main components, namely a cleats conveyor 16, a case support 18 and a robotic arm 20 carrying a pick-up tool (shown in FIGS. 6 to 9) to pick-up stand-up pouches from the cleats conveyor 16 and deposit them in the upright configuration in the case supported on the case support 18.

Figure 4:
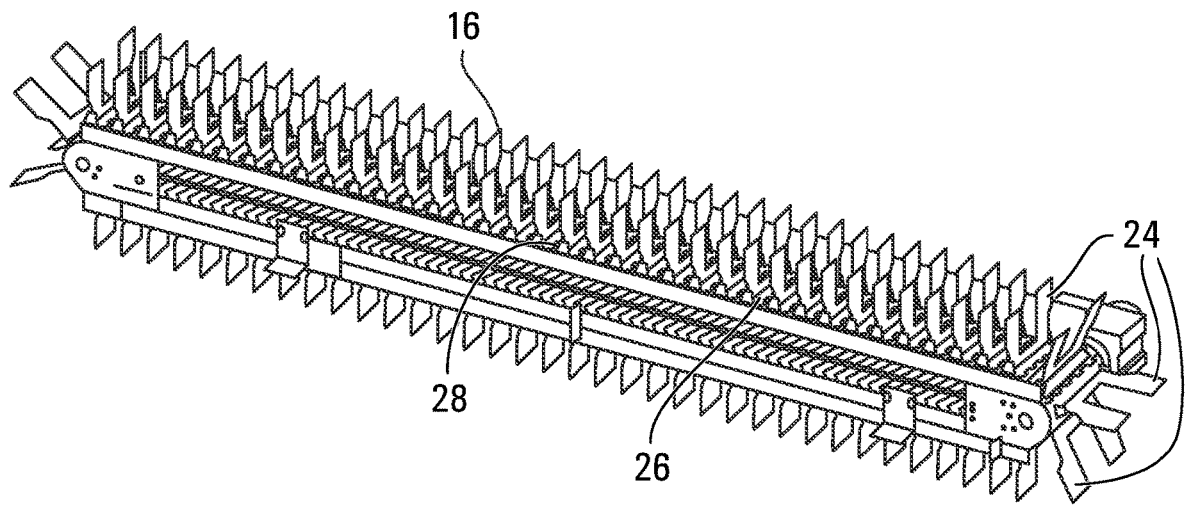
FIG. 4 is perspective view of the cleats conveyor.

The cleats conveyor 16 is shown in greater detail at FIG. 4. It has an endless belt 22 that loops a pair of spaced apart rollers, one the rollers being a driven roller such as to impart movement of the belt 22. A series of cleats 24 are arranged serially and in a spaced apart relationship on the endless belt 22. As depicted in the drawing, each cleat has a base that is attached to the endless belt 22 such that the body of the cleat, which is substantially planar is maintained perpendicular to the endless belt surface. In this fashion, the cleats that are located on the upper run of the endless belt 22 are substantially vertical and generally parallel to each other. In addition, their spacing is such that a stand-up pouch can fit between then. The cleat spacing can vary according to the size of the stand-up pouch. For thicker stand-up pouches, the cleats can be spaced more than for thinner stand-up pouches.

FIG. 4 illustrates in greater detail certain elements of the conveyor 16. In particular, the conveyor 16 has tabs 26 arranged collectively to form side barriers running on each side of the series of cleats 24. In a specific form of implementation, each tab is integrally formed with the belt 22 and projects upwardly therefrom. Generally, the tab extends transversally to the main cleat body. The tabs provide lateral support to the stand-up pouches and avoid the stand-up pouches from falling off the conveyor 16 as they are transported. The tabs extend upwardly up to a certain height of the cleats 22. The height and sizing of the tabs can vary depending on the stand-up pouch configuration.

It will be noted that the individual tabs 26 are spaced apart from each other in order to leave a gap 28 which is positioned centrally to the inter-cleat space. The gaps 28 on both side barriers register with each other in order to accommodate pick-up fingers of the pick-up tool as it will be described below.

As a possible variant, the tabs can be replaced by a row of upwardly projecting bristles or filaments sufficiently rigid and close to each other to form a continuous barrier running along the conveyor 16. The bristles are sufficiently rigid to prevent the pouches from fallig off the conveyor but they can be pushed aside to allow the fingers of the pick-up tool to enter the inter-cleat spaces and pick the pouches.

Figure 3:
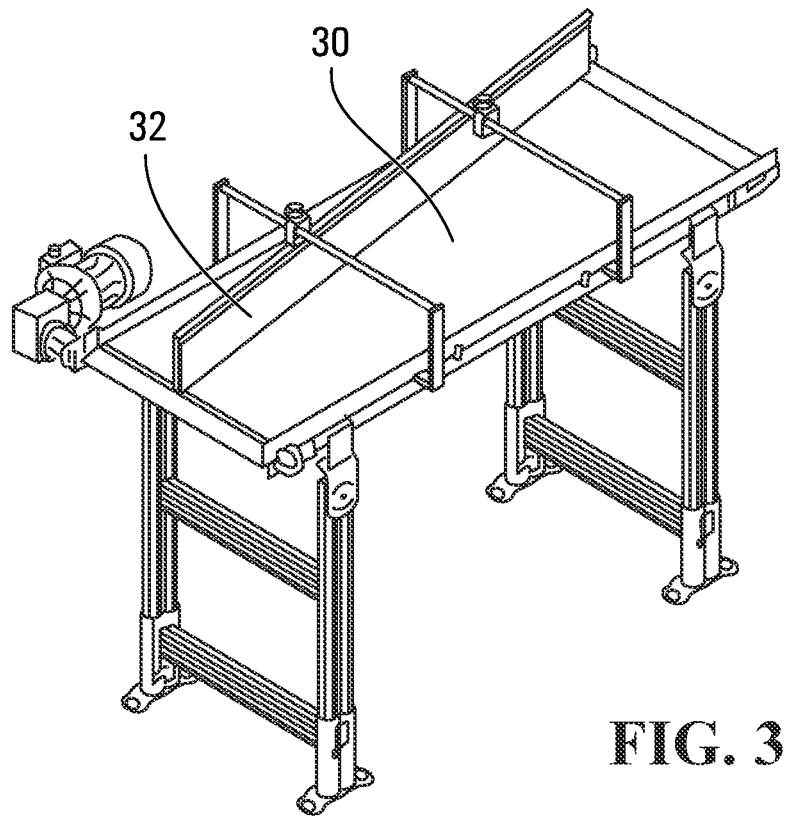
FIG. 3 is a perspective view of a positioning conveyor used with the robotic cell in FIG. 1 to provide a supply of stand-up pouches to the cleats conveyor of the robotic cell.

The cleats conveyor 16 is supplied with pouches via a positioning conveyor 30 which is depicted in FIG. 3. The positioning conveyor 30 has an upper run that is generally horizontal with a guide baffle 32 that constraints the pouches that travel in bulk on the conveyor 30 toward a conveyor outlet that has a width generally corresponding to the width of the cleats conveyor 16, in order to perform a smoot pouch transition from one conveyor to the other.

The case support 18 is another conveyor belt on which empty cases are placed at the conveyor entry 34 and cases filled with pouches are delivered at the conveyor exit 38. The case support 18 is sequentially operated in that the empty case is positioned at a location where the robotic arm will fill it, it is stopped there and remains at that position until filled, and then the conveyor belt is started to bring it to the exit 38. In contrast the cleats conveyor 16 operates constantly and the robotic arm 20 cycles between the both conveyor in order to pick up pouches from the cleats conveyor 16 and place them in the case at the opposite side on the case support 18.

Figure 5:
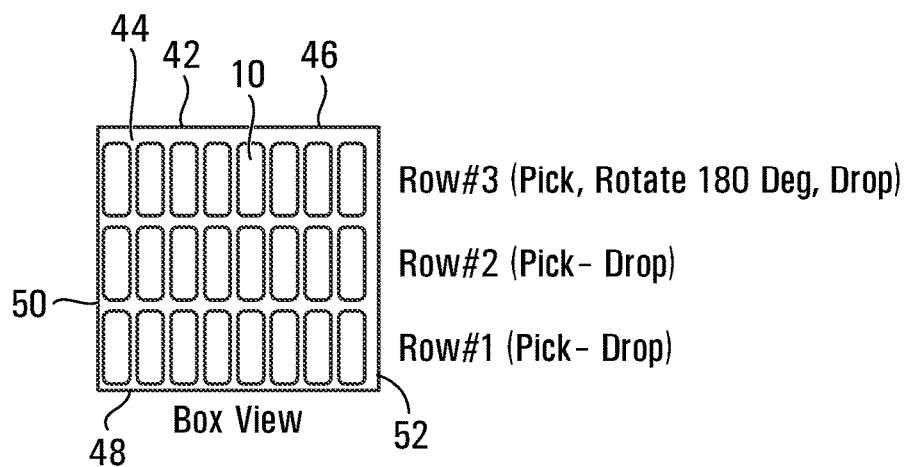
FIG. 5 is a schematical view of packaging case, such as a cardboard box, showing the arrangement of stand-up pouches achieved with the robotic cell of FIG. 1.
Figure 6:
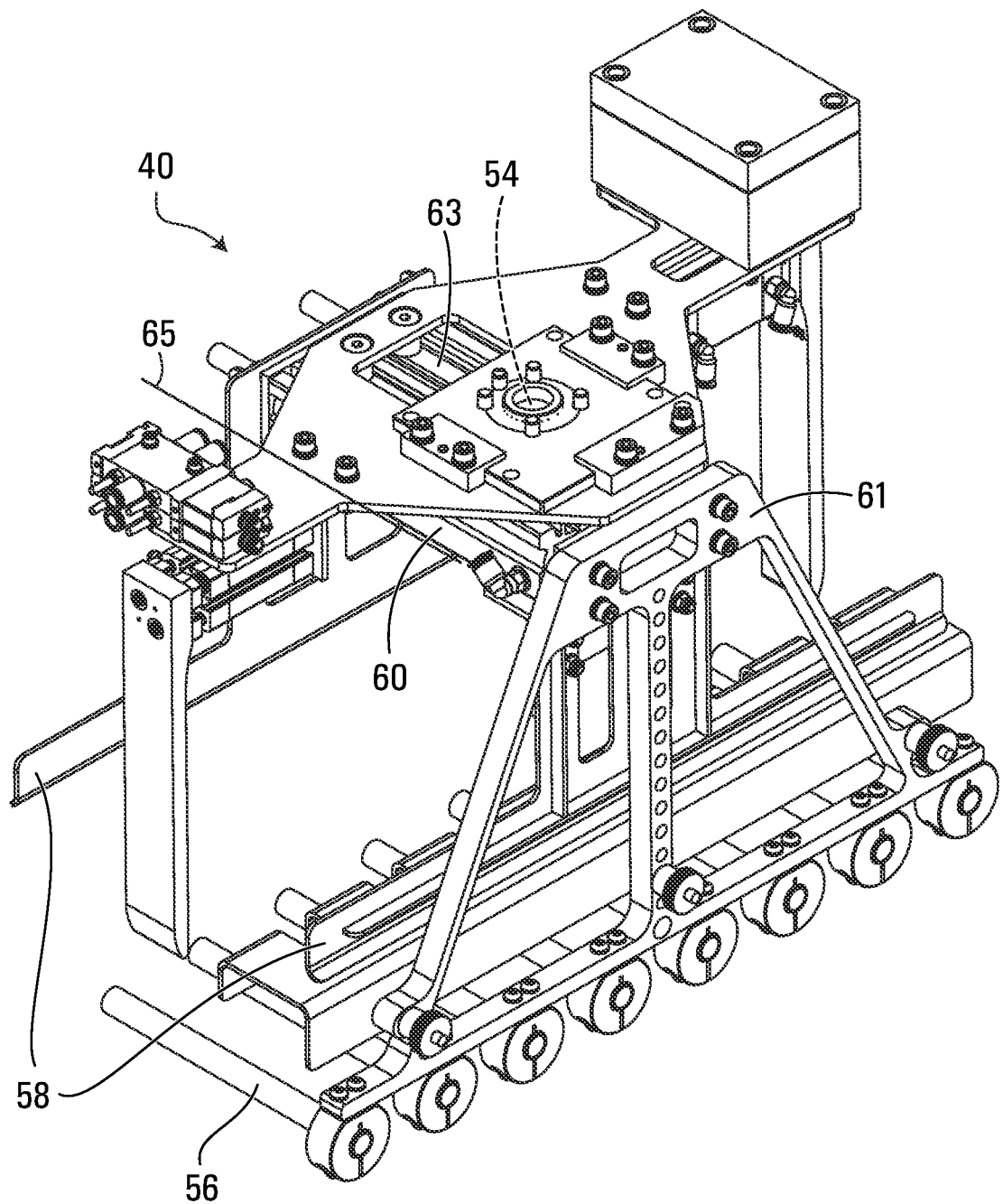
FIGS. 6, 7 and 9 are perspective views of the robotic arm tool to pick-up multiple stand-up pouches from the cleats conveyor and deposit them in the packaging case as per the arrangement shown in FIG. 5.
Figure 7:
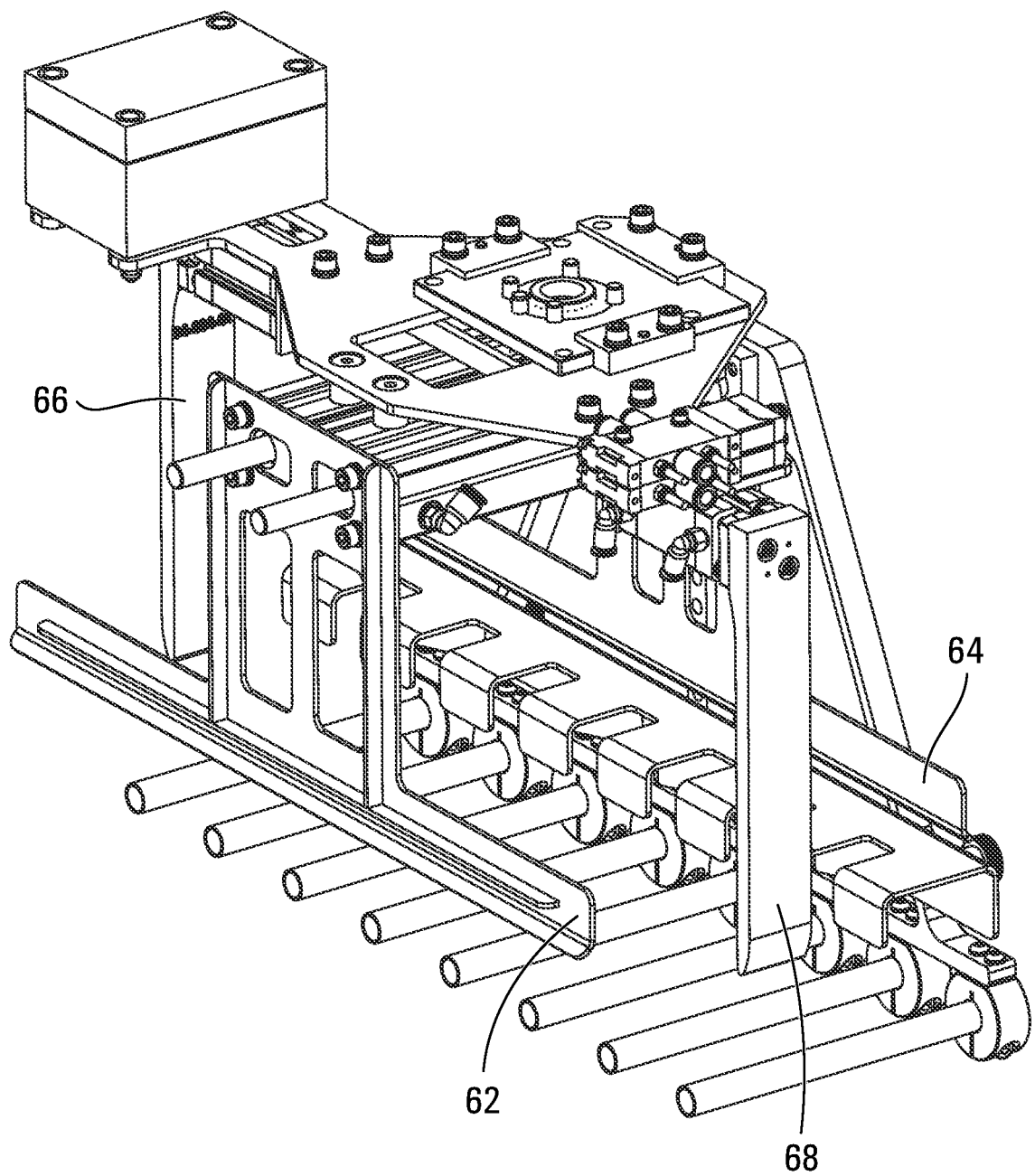
Figure 8:
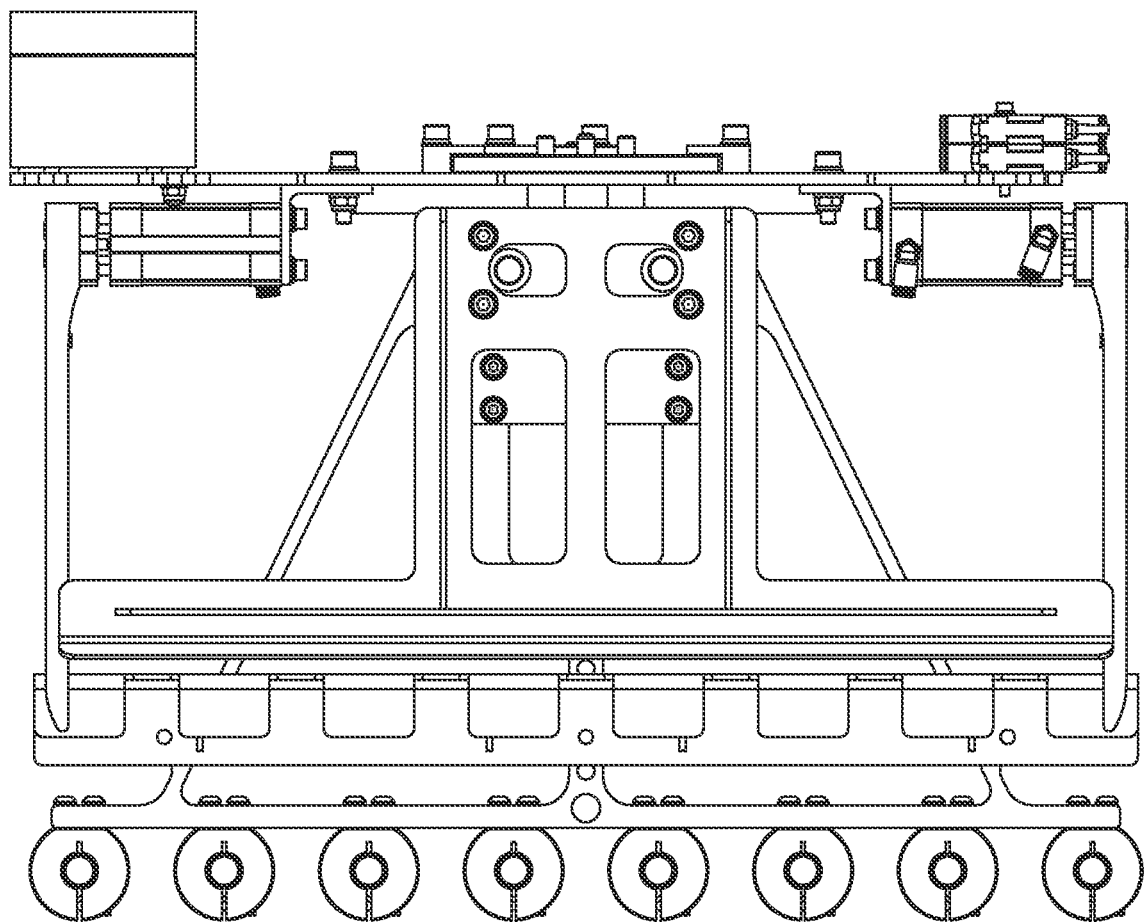
FIG. 8 is an elevational view of the robotic arm tool shown in FIGS. 6, 7 and 8.

At the extremity of the robotic arm is placed a tool 40, depicted in FIGS. 6, 7 and 8 which is configured to pick up a plurality of pouches maintained in the upright position on the cleats conveyor 16 and deposit them in the case 42 shown in FIG. 5. It will be noted in FIG. 5 that the pouches 10 are arranged in three rows of 8 pouches that are held in place by the bottom of the case 44, the front wall 46 of the case, the back wall 48 of the case, the left side wall 50 of the case and the right side wall 52 of the case. It will be understood that the pouches 10 are also held in place during transport by the top wall of the case 42, which would be removed when the case is placed on a shelf in the retail store such as to allow a customer to pick-up the pouches 10.

Note that the illustration in FIG. 5 is merely an example and the case may hold more than three rows of pouches or less than three row of pouches.

Referring back to FIGS. 6, 7, 8 and 9 the pick-up tool 40 is able to rotate about a vertical axis 54 shown by doted lines. To achieve this motion, actuators (not shown) are provided on the robotic arm under the control of a data processing device, discussed later, to position the pick-up tool at a selected angular orientation in a horizontal plane, by turning the tool 40 about the axis 54.

The tool 40 has an array of supporting fingers 56 to lift from the cleats conveyor 16 a plurality of pouches simultaneously. In a specific example, the number of pouches that are picked up in a single stroke of the robotic arm 20 with the pick-up tool 40 correspond to the number of pouches that fit in a single row of the case 42. In the example shown in the drawings, that would be 8 pouches, but of course that can vary depending on the size of the case 42. The individual fingers 56 are spaced apart to line up with the gaps 28 between the tabs 26 of the cleats conveyor 16. Accordingly, when the pick-up tool will insert the array of supporting fingers through the tabs, the fingers enter under the pouches that are held in the upright position between the cleats 24. The sequence of movements to extract the pouches from the cleats conveyor 16 will be discussed below.

Figure 9:
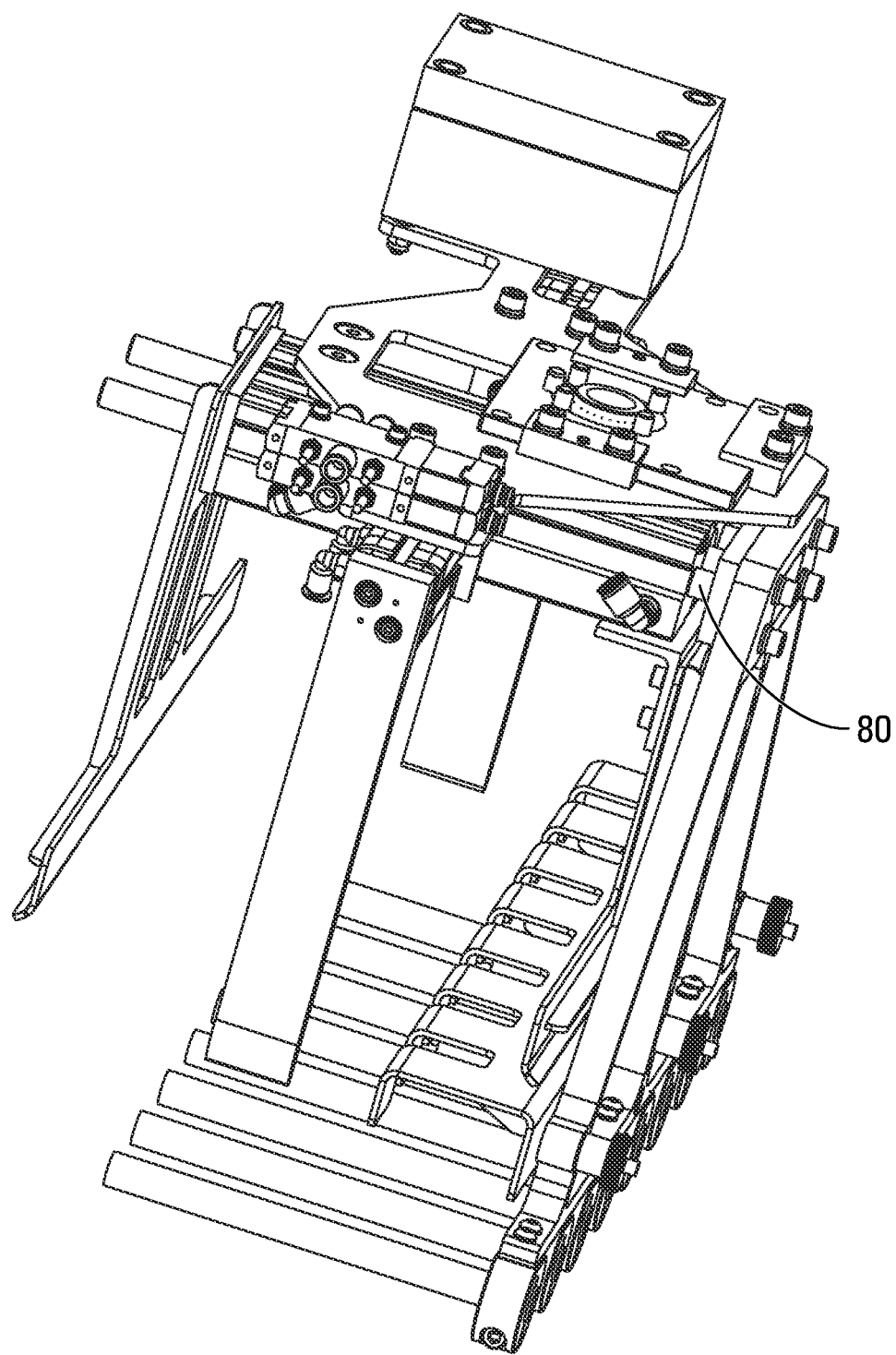

Note that the array of supporting fingers is arranged to lie in a generally horizontal plane. The fingers are mounted to a frame 61 which in turn is mounted to an actuator 63 to move the frame 61 and the array of supporting fingers 56 back and forth along the direction shown by the axis 65. FIGS. 6 and 7 show the array of supporting fingers 56 moved in the retracted position, where the fingers are underneath the tool 40. In FIG. 9, the actuator 63 is extended and the fingers 56 are moved laterally. The actuator is preferably a pneumatic actuator but can be another kind of actuator such as an electric one.

Above the fingers 56 is located a gripping device 58 that includes two pairs of jaws in a spaced apart relationship. The gripping device includes a first pair of jaws 62 and 64 that are opposite and face each other and a second pair of jaws 66, 68 that face each other. The jaws 66, 68 are mounted to actuators that can move the jaws 66, 68 toward and away from each other.

Figure 10:
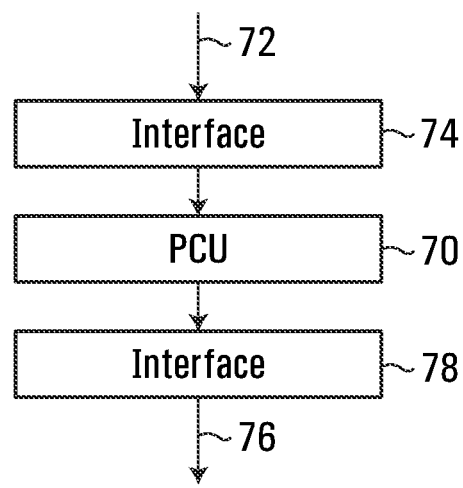
FIG. 10 is a block diagram showing the components of a computerized control system for operating the robotic cell of FIG. 1.

The robotic cell has a computerized control system, including one or more processors that receive inputs from a range of different sensors that may include position sensors to generate signals controlling the movement of the robotic arm including the pick-up tool 40 and the cleats conveyor 18 and the case support 18. A block diagram of the computerized control system is shown in FIG. 10.

The computerized control system has a Central Processing Unit (CPU) 70 that executes software comprising individual instructions. The CPU 70 receives sensors input 72 via a suitable interface 74. As indicated earlier, the sensors input 72 collectively designate the outputs of a range of sensors including:

1) Position sensors or switches.
2) A camera sensor that can be placed on the robotic arm 20, in particular on the pick-up tool 40. The camera sensor provides an image data flow that the CPU 70 processed to perform image recognition in order to identify objects of interest in the image.
3) Operational condition of the cleats conveyor 16, in particular a condition indicating that a sufficient number of pouches are available for pick-up by the pick-up tool 40;
4) Operational condition of the case support 18, for example indicating that an empty case is loaded and available to receive the pouches therein.

On the basis of the sensor inputs 72 the CPU generates actuator outputs to move the robotic arm 20, including the pick-up tool 40 and also to control the movement of the cleats conveyor 16 and the case support 18. The actuator outputs and other control signals are output via an interface 76.

The robotic cell operates as follows.

Assume the cleats conveyor 16 is loaded with at least 8 pouches that have been picked up from the positioning conveyor 30. The 8 pouches are held between the individual cleats 24 and laterally held in the cleats conveyor 16 by the lateral support tabs 26. The control system issues a control signal for the cleats conveyor 16 to stop to allow the robotic arm 20 to pick up the pouches. Alternatively, the robotic arm 20 may be synchronized with the movement of the cleats conveyor 16 and laterally move with the cleats conveyor 16 such as to perform the pouch pick up without the necessity of the cleats conveyor 16 stopping.

The pouch pick-up operation is initiated by setting up the pick-up tool into a condition in which it can engage the pouches without interference with the slats 24. First, the fingers are shifted sideways by the pneumatic actuator 63 to clear the space between the jaws 62-68. This is best shown at FIG. 9. The fingers 56 are laterally offset with relation to the jaws 62-68 thus allowing to lower the pick-up tool including the jaws 62-69 on the cleats conveyor 16 such that the first pair of jaws 62-64 will be on each lateral side of the cleats 24 while each of the jaws 66-68 will fit between two adjacent cleats. Since the jaws 66-68 are relatively thin, then can be inserted between two adjacent cleats even though there is a pouch present. The fingers 56 are laterally offset sufficiently such that their tips clear the cleats conveyor 16. The insertion movement above is made by aligning the fingers 56 with the gaps 28 between the tabs 28. The alignment can be done by locating the pick-up tool using some sort of reference mark on the cleats conveyor 16 that can be identified via image recognition such that the fingers 56 are in the proper position and will not interfere with the tabs 26. Once the proper alignment of the fingers 56 and the gaps 28 has been achieved and the lowering movement that positions the jaws 62-68 on the cleats conveyor 16 is effected, the fingers 56 are advanced laterally by the actuator 63 such that the fingers 56 penetrate the space between the cleats 24 and enter under the pouches held between the cleats 24. The depth of the fingers 56 should be sufficient to support the pouches sufficiently and avoid they fall off. It is not necessary for the fingers to have the same length as the width of the pouches (as measured transversally to the movement of the cleats 24). Advantageously, the fingers should have a length that does not exceed the width of the pouches to facilitate the release of the pouches in the case and the retraction of the pick-up tool 40 from the case.

The pick-up tool 40 in a position to hold and lift up the pouches from the cleats conveyor 16 is shown at FIG. 7.

After the fingers 56 fully support the pouches from below, the robotic arm lifts the pick-up tool 40 up such that the fingers 56 will lift up the 8 pouches. The jaws 62-68 then move to the closed position in which they are brought closer to the pack of pouches such as to more firmly engage them and avoid that a pouch falls off from the pick-up tool 40.

Note it is also possible to provide the jaws with 66, 68 with actuators to bring them closer somewhat and gather the pouches for increased stability while the pouches are being carried by the pick-up tool.

The robotic arm then moves the pick-up tool 40 over the over the case 42 and aligns the pick-up tool such that the 8 pouches are above the row 1. The robotic arm then lowers the pick-up tool 40 until the fingers 56 engage the bottom wall 46 of the case. The pick-up tool 40 is then operated to laterally move the fingers 56 such they acquire the position as shown in FIG. 9. In that position the fingers 56 release the pouches which sit on the bottom wall 46. The jaws 62-68 open and the pick-up tool is lifted up from the case 42. It should be appreciated that the lateral motion of the fingers 56, from the position shown in FIG. 7 to the one in position 9 is possible as the row 2 is empty and there is no interference.

The operation is then repeated to fill row 2 with pouches. The operation is performed in the same way with row 1, since row 3 is empty and provides enough space for the fingers to retract there and then the pick-up tool 40 be lifted and extracted from the case 42.

However, the operation for row 3 is different as there is no more space in the case 42 to retract the fingers 56. In this case the pick-up tool 40 is not inserted into the case 42, instead it is maintained above the rows 1 and 2 of pouches. In particular, the pick-up tool 40 is positioned such that the pack of pouches held by the pick-up tool 40 is aligned with empty space or row 3. The fingers 56 are then retracted to put the pick-up tool 40 in the position shown in FIG. 9 allowing the pouches to fall down into the case 42. However, the pouches of row 2 and the sides of the case 42 continue to guide the pouches as they fall down to prevent them from tipping over, thus the pouches maintain their upright orientation, thus completing the filling of the case 42.

The case 42 can then be moved off the support 18, closed and shipped to the retailer. At the retailer location the case 42 is opened, for instance the panels forming the top wall can be cut-off leaving only the side walls and bottom wall of the case 42 in which the pouches are held in three rows and in the upright position. The pouches are thus neatly aligned and can be easily picked up by the consumer.

The invention claimed is:

1. A system, the system comprising:
    a. a conveying device to convey articles to be packed, the articles being in a serial configuration;
    b. a support for a case to be packed with the articles in which the articles are configured to be placed in a plurality of rows, including a first row and a last row adjacent to a side wall of the case;
    c. a robotic mechanism configured to pick-up a batch of articles from the conveying device and to deposit the batch of articles into the case, wherein the batch of articles includes a plurality of articles that fit in a single row of the case, the robotic mechanism including an article supporting device moveable between an extended position and a retracted position, wherein in the extended position, the article supporting device engages the batch of articles such that the articles are supported by the article supporting device, the robotic mechanism being configured to execute a first and a second article loading cycle in the case, wherein:
        i. the first article loading cycle being characterized by lowering the batch of articles in the case and retracting the article supporting device to allow the batch of articles to sit on a bottom of the case as a single row;
        ii. the second article loading cycle being characterized by retracting the article supporting device while the batch of articles is at a distance from the bottom of the case and allowing the batch of articles to fall in the case to sit on the bottom of the case as a single row, while being guided by an adjacent row of articles already deposited in the case and the side wall of the case.

2. A system as defined in claim 1, wherein the articles include stand-up pouches.

3. A system as defined in claim 2, wherein the conveying device includes a cleats conveyor, comprising a plurality of cleats in a spaced apart relationship, a spacing between adjacent cleats being selected to accommodate a stand-up pouch.

4. A system as defined in claim 3, wherein the supporting device includes a plurality of fingers in a spaced apart relationship configured to engage the batch of articles such that the articles are supported by the fingers.

5. A system as defined in claim 4, wherein the robotic mechanism includes an articles pick-up tool comprising the supporting device.

6. A system as defined in claim 5, wherein the pick-up tool includes a plurality of jaws to support the batch of articles picked up from the cleats conveyor.

7. A system as defined in claim 6, wherein the pick-up tool includes an actuator to move the supporting device between the extended position and the retracted position.

8. A system as defined in claim 6, wherein the robotic mechanism includes a robotic arm configured to move the pick-up tool from the cleats conveyor to the support for the case.

9. A system as defined in claim 8, wherein the robotic mechanism is configured to pick up the batch of articles while the cleats conveyor is in motion.

10. A system as defined in claim 8, wherein the system is configured as a modular unit.

11. A system, the system comprising:
    a. a conveying device to convey articles to be packed, the articles being in a serial configuration;
    b. a support for a case to be packed with the articles in which the articles are configured to be placed in a plurality of rows, including a first row and a last row adjacent to a side wall of the case;
    c. a robotic mechanism configured to pick-up a batch of articles from the conveying device and to deposit the batch of articles into the case, such that the deposited batch of articles is placed in the case as a single row, the robotic mechanism including an article supporting device moveable between an extended position and a retracted position, wherein the supporting device includes a plurality of fingers in a spaced apart relationship wherein the plurality of fingers are configured to engage the batch of articles in the extended position of the article supporting device such that the articles are supported by the fingers, the robotic mechanism being configured to execute a first and a second article loading cycle in the case, wherein:
        i. the first article loading cycle being characterized by lowering the batch of articles in the case and retracting the article supporting device to allow the batch of articles to sit on a bottom of the case;
        ii. the second article loading cycle being characterized by retracting the article supporting device while the batch of articles is at a distance from the bottom of the case and allowing the batch of articles to fall in the case while being guided by an adjacent row of articles already deposited in the case and the side wall of the case.

12. A system as defined in claim 11, wherein the articles include stand-up pouches.

13. A system as defined in claim 12, wherein the conveying device includes a cleats conveyor, comprising a plurality of cleats in a spaced apart relationship, a spacing between adjacent cleats being selected to accommodate a stand-up pouch.

14. A system as defined in claim 13, wherein the robotic mechanism includes an articles pick-up tool comprising the supporting device.

15. A system as defined in claim 14, wherein the pick-up tool includes a plurality of jaws to support the batch of articles picked up from the cleats conveyor.

16. A system as defined in claim 14, wherein the pick-up tool includes an actuator to move the supporting device between the extended position and the retracted position.

17. A system as defined in claim 14, wherein the robotic mechanism includes a robotic arm configured to move the pick-up tool from the cleats conveyor to the support for the case.

18. A system as defined in claim 17, wherein the robotic mechanism is configured to pick up the batch of articles while the cleats conveyor is in motion.

19. A system as defined in claim 17, wherein the system is configured as a modular unit.

\* \* \* \* \*